United States Patent
Naqvi et al.

(10) Patent No.: US 8,820,341 B2
(45) Date of Patent: Sep. 2, 2014

(54) METHOD AND APPARATUS TO DETECT THE PRESENCE OF HYDRAULIC PRESSURE IN A TRANSMISSION

(75) Inventors: Ali K. Naqvi, White Lake, MI (US); Syed Naqi, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 13/012,902

(22) Filed: Jan. 25, 2011

(65) Prior Publication Data

US 2012/0186675 A1 Jul. 26, 2012

(51) Int. Cl.
*G05D 16/20* (2006.01)

(52) U.S. Cl.
USPC ............ 137/12; 137/14; 137/487.5; 137/596; 700/282; 701/60

(58) Field of Classification Search
USPC ................. 137/12, 596, 14, 487.5; 700/282; 701/60
See application file for complete search history.

(56) References Cited

U.S. PATENT DOCUMENTS

| | | | |
|---|---|---|---|
| 4,961,441 A * | 10/1990 | Salter | 137/14 |
| 5,443,087 A * | 8/1995 | Myles | 137/14 |
| 6,434,466 B1 * | 8/2002 | Robichaux et al. | 701/54 |
| 7,288,039 B2 | 10/2007 | Foster et al. | |
| 7,568,990 B2 | 8/2009 | Sah et al. | |
| 7,699,729 B2 * | 4/2010 | Inoue et al. | 474/28 |
| 2005/0199287 A1 * | 9/2005 | Shajii et al. | 137/487.5 |
| 2009/0112421 A1 | 4/2009 | Sah et al. | |

FOREIGN PATENT DOCUMENTS

| | | |
|---|---|---|
| CN | 1490542 A | 4/2004 |
| CN | 101487530 A | 7/2009 |
| JP | 2009293722 A | 12/2009 |

OTHER PUBLICATIONS

Chinese Office Action for CN Application No. 201210020194.2 Issued Mar. 27, 2014.

* cited by examiner

*Primary Examiner* — William McCalister
(74) *Attorney, Agent, or Firm* — Quinn Law Group, PLLC

(57) ABSTRACT

A method is provided to detect the presence of hydraulic line pressure in a hydraulic control system in an electromechanical transmission. The method includes determining an estimated hydraulic line pressure of the hydraulic control system based upon an input flow and an output flow of hydraulic fluid. The input flow and output flow are regulated with a pressure control device, which is energizable on operator demand. A pressure detection device is fluidly connected to the pressure control device to detect the presence of hydraulic pressure. An override module is applied to the estimated hydraulic line pressure to determine a corrected hydraulic line pressure. The override module sets the corrected hydraulic line pressure to predetermined values based on the operating state indicated by the pressure detection device. The override module corrects for an over-estimation of hydraulic line pressure in operating conditions such as low environmental temperatures.

12 Claims, 4 Drawing Sheets

US 8,820,341 B2

METHOD AND APPARATUS TO DETECT THE PRESENCE OF HYDRAULIC PRESSURE IN A TRANSMISSION

TECHNICAL FIELD

This invention relates in general to control systems for electromechanical transmissions.

BACKGROUND

A hydraulic control system is known to provide pressurized fluid for a number of functions throughout a powertrain. During vehicle operation, the vehicle transmission needs to maintain enough hydraulic pressure to engage and hold clutches and for other functions. The hydraulic line pressure is generally estimated using sources such as engine speed and electric pump speed. However, the accuracy of estimations of hydraulic line pressure is compromised by operating conditions such as low environmental temperatures.

SUMMARY

A method is provided to detect the presence of hydraulic line pressure in a hydraulic control system in a transmission. The method includes determining an estimated hydraulic line pressure of the hydraulic control system based upon an input flow and an output flow of hydraulic fluid. The input flow and output flow are regulated with a pressure control device, which is energizable on operator demand. A pressure detection device is fluidly connected to the pressure control device to detect the presence of hydraulic pressure. An override module is applied to the estimated hydraulic line pressure to determine a corrected hydraulic line pressure. The override module sets the corrected hydraulic line pressure to predetermined values based on the operating state indicated by the pressure detection device. The override module corrects for an over-estimation of hydraulic line pressure in operating conditions such as low environmental temperatures.

The override module monitors the state of the pressure detection device when the pressure control device is de-energized. The pressure detection device is configured to indicate a first operating state if the detected pressure is below a threshold pressure when the pressure control device is de-energized. The pressure detection device is configured to indicate a second operating state if the detected pressure exceeds a threshold pressure when the pressure control device is de-energized.

The override module sets the corrected hydraulic line pressure to a first calibrated value when the pressure detection device indicates the first operating state. The override module sets the corrected hydraulic line pressure to a second calibrated value when the pressure detection device indicates the second operating state and the estimated hydraulic line pressure is below the threshold pressure. The second calibrated value may be the threshold pressure. The override module sets the corrected hydraulic line pressure to be the estimated hydraulic line pressure when the pressure detection device indicates the second operating state and the estimated hydraulic line pressure is above the threshold pressure.

A hydraulic control system is provided. The control system has a line pressure estimation module to determine an estimated hydraulic line pressure based upon an input flow and an output flow of hydraulic fluid. A pressure control device is used to regulate the input flow and the output flow, the pressure control device being energizable based on operator demand. A pressure detection device is fluidly connected to the pressure control device. The pressure detection device is configured to indicate a first operating state if the pressure is below a threshold pressure when the pressure control device is de-energized. The pressure detection device is configured to indicate a second operating state if the pressure exceeds the threshold pressure when the pressure control device is de-energized. An override module applied to the estimated hydraulic line pressure to determine a corrected hydraulic line pressure, the override module setting the corrected hydraulic line pressure to predetermined values based on the operating state indicated by the pressure detection device.

The above features and advantages and other features and advantages of the present invention are readily apparent from the following detailed description of the best modes for carrying out the invention when taken in connection with the accompanying drawings.

DETAILED DESCRIPTION

Figure 1:
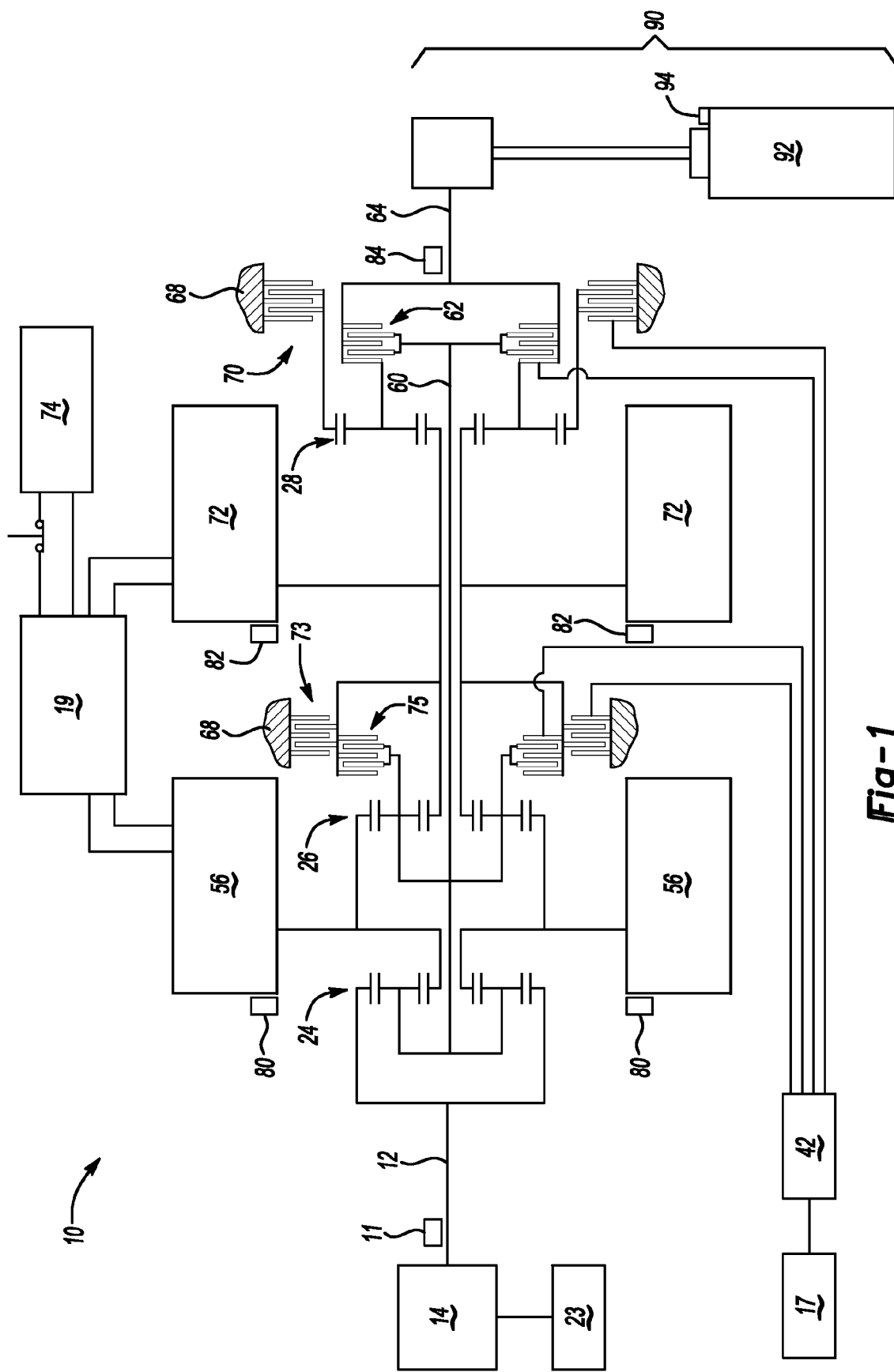
FIG. 1 is a schematic diagram of an exemplary powertrain having a hydraulic circuit.

Referring to the Figures, wherein like reference numbers refer to the same or similar components throughout the several views, FIG. 1 is a schematic diagram of an exemplary electro-mechanical hybrid powertrain. The transmission 10 is exemplary only, as the line pressure estimation module 200 and override module 250 described herein may be applied to any type of control system and vehicle. For example, the vehicle may be a range-extended electric vehicle, a vehicle with a hybrid transmission or one with a non-hybrid transmission.

FIG. 1 shows a two-mode, compound-split, electromechanical hybrid transmission 10 operatively connected to an engine 14 and first and second electric machines 56 and 72. The engine 14 and first and second electric machines 56 and 72 each generate power which can be transmitted to the transmission 10, the power being described by input torque and speed. The exemplary engine 14 operates to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed and the input torque to the transmission 10 due to placement of torque-consuming components on the input shaft 12 between the engine 14 and the transmission 10, e.g., a hydraulic pump (not shown) and/or a torque management device (not shown).

As shown in FIG. 1, the exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42 (shown in detail in FIG. 3 and described below), may be controlled by a transmission control module (hereafter 'TCM') 17, is operative to control clutch states. Clutches C2 62 and C4 75 may comprise hydraulically-applied rotating friction clutches. Clutches C1 70 and C3 73 may comprise hydraulically-controlled stationary devices that can be selectively grounded to a transmission case 68. Each of the clutches C1 70, C2 62, C3 73, and C4 75 may be hydraulically applied, selectively receiving pressurized hydraulic fluid via the hydraulic control circuit 42 (shown in FIGS. 1 and 3).

The input torques from the engine 14 and the first and second electric machines 56 and 72 are generated as a result of energy conversion from fuel or electrical potential stored in an electrical energy storage device (hereafter 'ESD') 74. The first and second electric machines 56 and 72 may comprise three-phase AC machines, each including a stator (not shown) and a rotor (not shown), and respective resolvers 80 and 82. Each of the resolvers 80 and 82 is operatively connected to a transmission power inverter control module (hereafter 'TPIM') 19.

The transmission 10 includes an output member 64, e.g. a shaft, which is operably connected to a driveline 90 for a vehicle (not shown), to provide output power, e.g., to vehicle wheels 92, as shown in FIG. 1. The output power is characterized in terms of an output rotational speed and an output torque. A transmission output speed sensor 84 monitors rotational speed and rotational direction of the output member 64. Each of the vehicle wheels 92, may be equipped with a sensor 94 adapted to monitor wheel speed, the output of which is monitored by a control module of a distributed control module system described with respect to FIG. 2, to determine vehicle speed.

Figure 2:
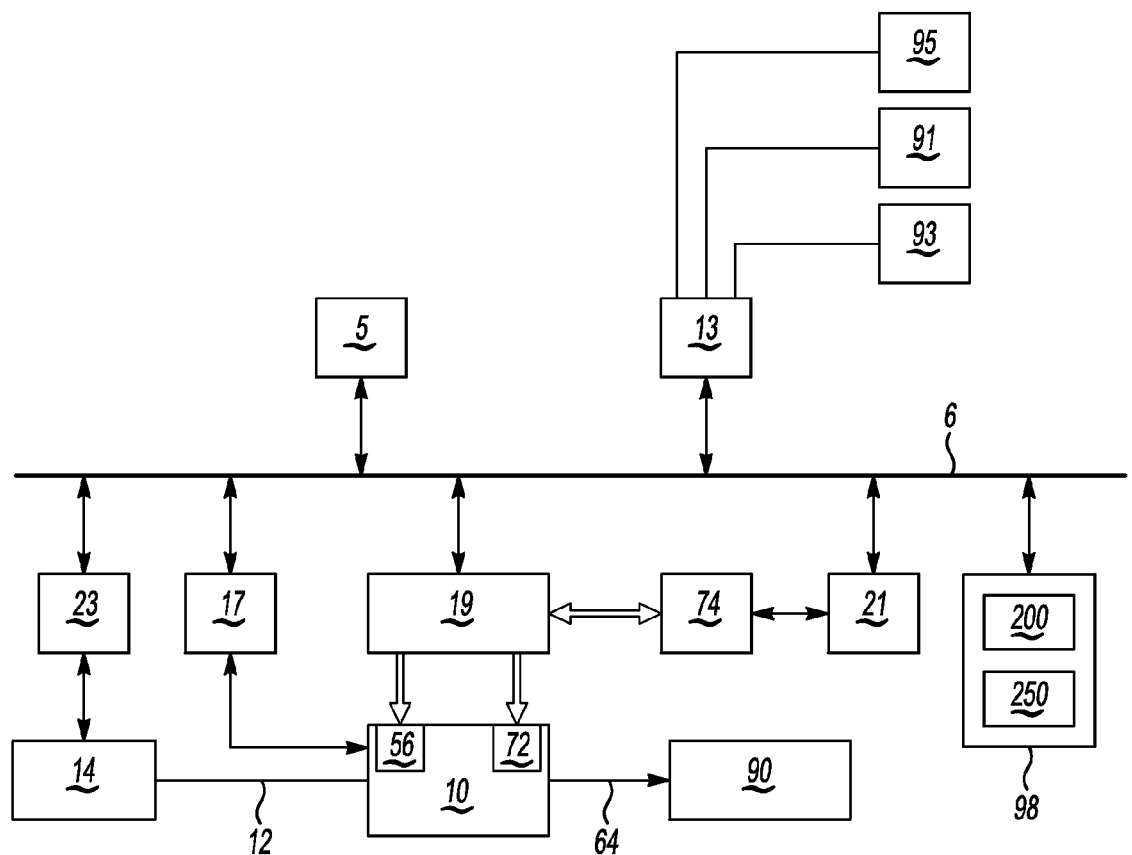
FIG. 2 is a schematic diagram of an exemplary control system for the powertrain shown in FIG. 1.

FIG. 2 is a schematic diagram of an exemplary control system for the powertrain shown in FIG. 1. The control system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. The aforementioned control modules communicate with other control modules, sensors, and actuators via a local area network bus 6.

A user interface 13 is operatively connected to a plurality of devices through which a vehicle operator directs operation of the powertrain. The devices include an accelerator pedal 91 from which an operator torque request is determined, an operator brake pedal 93, a transmission gear selector 95 and a vehicle speed cruise control (not shown). Based upon various input signals from the user interface 13 and the powertrain, including the ESD 74, the HCP 5 generates various commands, including: the operator torque request, a commanded output torque to the driveline 90, an engine input torque command, clutch torques for the torque-transfer clutches C1 70, C2 62, C3 73, C4 75 (shown in FIG. 1) of the transmission 10; and the torque commands for the first and second electric machines 56 and 72, respectively.

A controller 98 is operatively connected to the HCP 5 and executes a line pressure estimation function 200 (referred to herein as "line pressure estimation module 200") and override function 250 (referred to herein as "override module 250") which reside within the controller 98 or are otherwise readily executable by the controller 98. Execution of the line pressure estimation module 200 and override module 250 is described below with reference to FIGS. 4 and 5, respectively. The line pressure estimation module 200 and override module 250 are not limited to hybrid transmissions and may be applied to non-hybrid transmissions as well.

The ECM 23 is operatively connected to the engine 14. The ECM 23 receives the engine input torque command from the HCP 5. The ECM 23 determines the actual engine input torque provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed of the output member 64. Other actuators and sensors may be used to provide additional information from the TCM 17 to the HCP 5 for control purposes. The TCM 17 monitors inputs from pressure switches (shown in FIG. 3 and described below) and selectively actuates pressure control solenoids (shown in FIG. 3 and described below) of the hydraulic control circuit 42 (shown in FIGS. 1 and 3) to selectively actuate the various clutches C1 70, C2 62, C3 73, and C4 75 (shown in FIG. 1) to achieve various transmission operating range states.

The BPCM 21 is operatively connected to sensors (not shown) to monitor the ESD 74, including states of electrical current and voltage parameters, to provide information related to the state of the batteries of the ESD 74 to the HCP 5. Each of the control modules ECM 23, TCM 17, TPIM 19, BPCM 21 and controller 98 may be a general-purpose digital computer, a microprocessor, central processing unit or a computer-readable storage medium.

This exemplary powertrain selectively operates in one of several operating range states that can be described in terms of an engine state and a transmission state comprising a plurality of fixed gears and continuously variable operating modes. The engine state can be one of ON or OFF. For purposes of this description, when the engine state is OFF, the engine input speed is equal to zero revolutions per minute, i.e., the engine crankshaft is not rotating. A first continuously variable mode is selected by applying clutch C1 70 only in order to "ground" the outer gear member of the third planetary gear set 28. A second continuously variable mode is selected by applying clutch C2 62 only to connect the shaft 60 to the carrier of the third planetary gear set 28. A fixed gear operation provides a fixed ratio operation of input-to-output speed of the transmission 10.

A first fixed gear operation is selected by applying clutches C1 70 and C4 75. A second fixed gear operation is selected by applying clutches C1 70 and C2 62. A third fixed gear operation is selected by applying clutches C2 62 and C4 75. A fourth fixed gear operation is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72 are dependent on internal rotation of the mechanism as defined by the clutching and are proportional to the input speed measured at the input shaft 12.

In response to operator input via the accelerator pedal 91 and brake pedal 93 as captured by the user interface 13, the HCP 5 and one or more of the other control modules determine the commanded output torque intended to meet the operator torque request to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 91 and brake pedal 93 to the user interface 13 as previously described.

The control system manages torque inputs from the engine 14 and the first and second electric machines 56 and 72. The HCP 5 monitors the torque-generative devices, and determines the power output from the transmission 10 required to achieve the desired output torque to meet the operator torque request. The ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
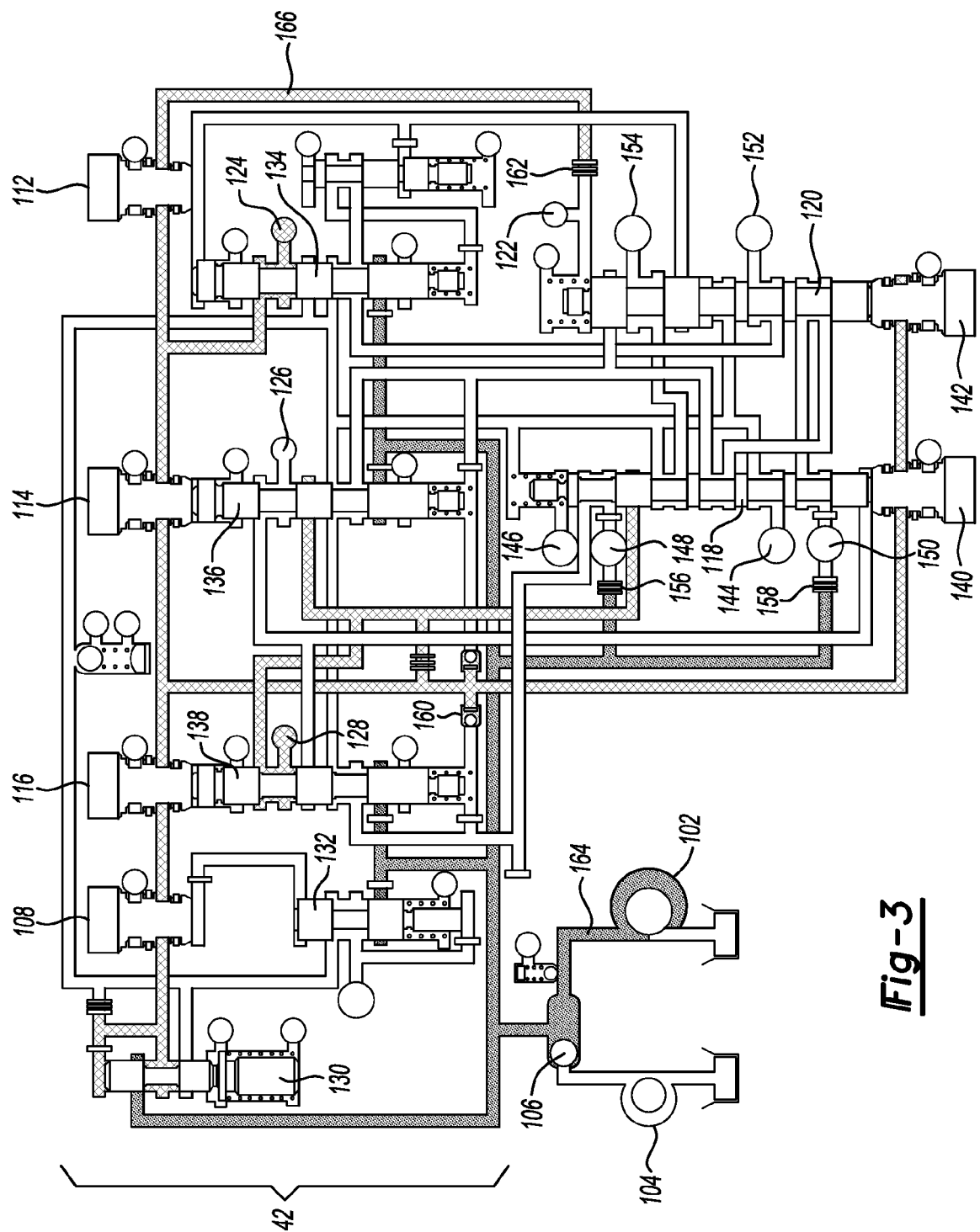
FIG. 3 is a schematic detailed diagram of the hydraulic circuit shown in FIG. 1.

FIG. 3 is a schematic diagram of the hydraulic control circuit 42 shown in FIG. 1. As noted above, this is an exemplary embodiment and the line pressure estimation module 200 and override module 250 may be applied to any other control circuit. A main hydraulic pump 102 is driven off the input shaft 12 from the engine 14 (shown in FIGS. 1-2) and an auxiliary pump 104 controlled by the TPIM 19 (shown in FIGS. 1-2) provides pressurized fluid to the hydraulic control circuit 42 through valve 106. The auxiliary pump 104 may comprise an electrically-powered pump of an appropriate size and capacity to provide sufficient flow of pressurized hydraulic fluid into the hydraulic control circuit 42 when operational. The hydraulic control circuit 42 selectively distributes hydraulic pressure to the torque-transfer clutches C1 70, C2 62, C3 73, and C4 75 (shown in FIG. 1), active cooling circuits for the first and second electric machines 56 and 72, and a base cooling circuit for cooling and lubricating the transmission 10.

The TCM 17 actuates the various clutches to achieve one of the transmission operating range states through selective actuation of hydraulic circuit flow control devices. The hydraulic control circuit 42 includes variable pressure control devices such as first, second, third and fourth pressure control solenoids 108, 112, 114, 116, respectively, as shown in FIG. 3. The hydraulic control circuit 42 also includes solenoid-controlled flow management valves, X-valve 118 and Y-valve 120.

The hydraulic control circuit 42 is fluidly connected to first, second, third and fourth pressure switches 122, 124, 126, and 128, respectively. The first pressure control solenoid 108 has a control position of normally high and is operative to modulate the magnitude of fluidic pressure in the hydraulic circuit through fluidic interaction with controllable pressure regulator 130 and spool valve 132. The controllable pressure regulator 130 and spool valve 132 interact with the first pressure control solenoid 108 to control hydraulic pressure in the hydraulic control circuit 42 over a range of pressures and may provide additional functionality for the hydraulic control circuit 42. The second pressure control solenoid 112 has a control position of normally high, and is fluidly connected to spool valve 134 and operative to effect flow therethrough when actuated. Spool valve 134 is fluidly connected to the third pressure switch 126. The third pressure control solenoid 114 has a control position of normally high, and is fluidly connected to spool valve 136 and operative to effect flow therethrough when actuated. Spool valve 136 is fluidly connected to the second pressure switch 124. The fourth pressure control solenoid 116 has a control position of normally low, and is fluidly connected to spool valve 138 and operative to effect flow therethrough when actuated. Spool valve 138 is fluidly connected to the fourth pressure switch 128.

A typical solenoid generally includes a movable armature, a coil portion connected to an energy source and a spring or other element that biases the solenoid to a default position. For example when the fourth pressure solenoid 116 is energized, its armature is pulled into its coil portion, thereby opening the valve 138. When a solenoid 116 is de-energized, its spring pulls fourth pressure solenoid 116 into its default position, thereby closing the valve 138.

The X-Valve 118 and Y-Valve 120 (shown in FIG. 3) each comprise flow management valves controlled by solenoids 140, 142, respectively, in the exemplary system, and have control states of High ('1') and Low ('0'). The control states refer to positions of each valve which control flow to different devices in the hydraulic control circuit 42 and the transmission 10. The X-valve 118 is operative to direct pressurized fluid to clutches C3 73 and C4 75 and cooling systems for stators of the first and second electric machines 56 and 72 via fluidic passages 144, 146, 148, 150 respectively, depending upon the source of the fluidic input, as is described hereinafter. The Y-valve 120 is operative to direct pressurized fluid to clutches C1 70 and C2 62 via fluidic passages 152 and 154 respectively, depending upon the source of the fluidic input, as is described hereinafter. The Y-valve 120 is fluidly connected to the first pressure switch 122.

The hydraulic control circuit 42 includes a base cooling circuit for providing hydraulic fluid to cool the stators of the first and second electric machines 56 and 72. The base cooling circuit includes fluid conduits from the valve 106 flowing directly to a first flow restrictor 156 which leads to fluidic passage 148 leading to the base cooling circuit for the stator of the first electric machine 56, and to a second flow restrictor 158 which leads to fluidic passage 150 leading to the base cooling circuit for the stator of the second electric machine 72. Active cooling of stators for the first and second electric machines 56 and 72 is effected by selective actuation of the first, second, third and fourth pressure control solenoids 108, 112, 114, 116, respectively, and solenoid-controlled flow management valves X-valve 118 and Y-valve 120, which leads to flow of hydraulic fluid around the selected stator and permits heat to be transferred therebetween, primarily through conduction. Third and fourth flow restrictors 160, 162 are also employed to control the flow of fluid in the hydraulic control circuit 42.

Referring to FIG. 3, the hydraulic control circuit 42 includes a high pressure fluid circuit 164 (shaded) and a low pressure fluid circuit 166 (cross-hatched) when the second, third and fourth pressure control solenoids 112, 114, 116, respectively, are in a 'de-energized' state or non-actuated. As shown in FIG. 3, the second and fourth pressure switches 124 and 128 (pressure detection devices) have access to the low pressure fluid 166 when their respective pressure control solenoids 112, 116 (pressure control devices) are de-energized.

The switches may be adapted to indicate one of two operating states when their respective pressure control solenoids are de-energized. The switches indicate a first operating state (no pressure detected) when the pressure is below a defined threshold pressure. The switches indicate a second operating state (pressure detected) when the pressure is at or above the defined threshold pressure.

The fluid output from each of the second, third and fourth pressure control devices 112, 114, 116, respectively, is selectively mapped to one of the four hydraulically-actuated clutches and stator cooling systems for first and second electric machines, 56 and 72, respectively, based upon commanded positions of the first and second flow management valves. Therefore, selective actuation provides cooling to the stator of the second electric machine 72, when both the X-valve 118 and the Y-valve 120 are commanded to Low. Selective actuation of second pressure control device 112 effects flow of hydraulic fluid to actuate clutch C2 when either of the X-valve 118 and the Y-valve 120 are commanded to High. Selective actuation of third pressure control device 114 effects flow of hydraulic fluid to actuate clutch C1 when both the X-valve 118 and the Y-valve 120 are commanded to Low. Selective actuation of third pressure control device 114 effects flow of hydraulic fluid to provide cooling to the stator of second electric machine 72 when the X-valve 118 is commanded to Low and the Y-valve 120 is commanded to High.

Selective actuation of third pressure control device 114 effects flow of hydraulic fluid to actuate clutch C1 when the X-valve 118 is commanded to High and the Y-valve 120 is commanded to Low. Selective actuation of third pressure control device 114 effects flow of hydraulic fluid to actuate clutch C3 when both the X-valve 118 and the Y-valve 120 are commanded to High. Selective actuation of the fourth pressure control device 116 effects flow of hydraulic fluid to provide cooling to the stator of first electric machine 56 when the X-valve 118 is commanded to Low, regardless of the position to which the Y-valve 120 is commanded. Selective actuation of third pressure control device 116 effects flow of hydraulic fluid to actuate clutch C4 when the X-valve 118 is commanded to High, regardless of the position to which the Y-valve 120 is commanded.

Figure 4:
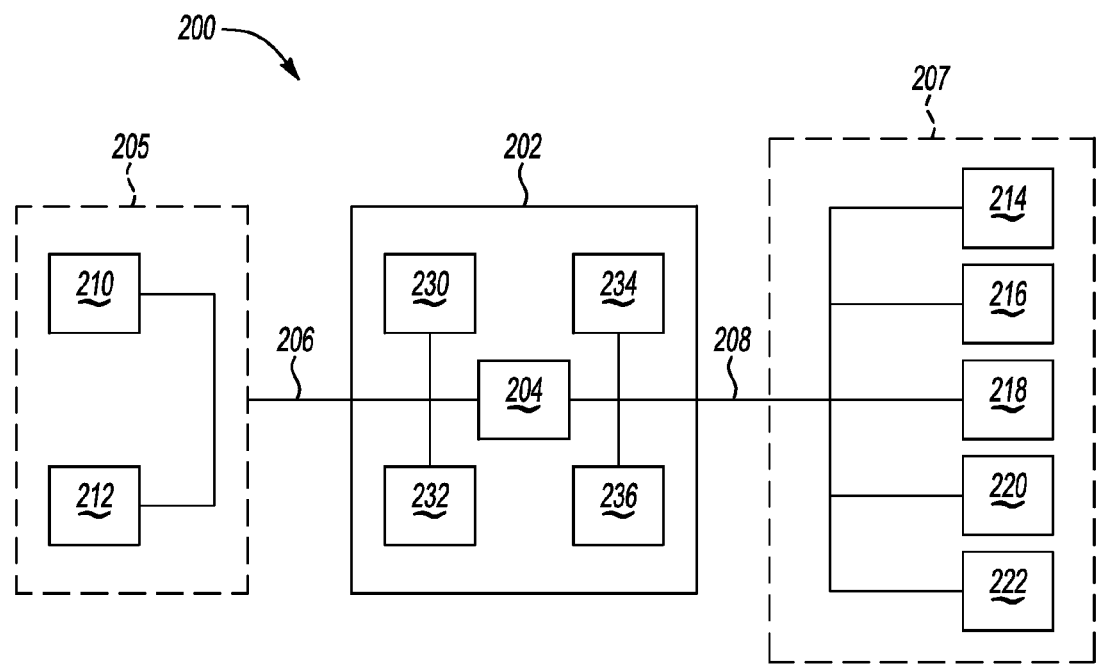
FIG. 4 is a schematic diagram of a line pressure estimation module to determine an estimated hydraulic line pressure.

FIG. 4 schematically illustrates a line pressure estimation module 200 for a hydraulic control system 202 having passages 204 for fluid flow. As shown in FIG. 2, a controller 98 is operatively connected to the HCP 5 to execute the line pressure estimation module 200 and the override module 250. The hydraulic control system 202 may be the hydraulic control system described above or any other suitable control system. The line pressure estimation module 200 determines an estimated hydraulic line pressure by comparing the input flow 206 and the output flow 208.

The input flow 206 (shown in FIG. 4) may be obtained with an input flow module 205 determining flow available from at least one hydraulic pump in the hydraulic control system 202. FIG. 4 shows a first main hydraulic pump 210 and an auxiliary hydraulic pump 212. The pumps 210, 212 can be electrically powered or may be mechanically driven. The internal impelling mechanism of a pump operates at some speed, drawing hydraulic fluid from a return line and pressurizing the hydraulic control system 202. The supply of hydraulic flow is affected by the speed of the pumps 210, 212; the back pressure exerted by the hydraulic line pressure and the temperature of the hydraulic fluid.

The output flow 208 (shown in FIG. 4) may be obtained with an output flow module 207 determining the various hydraulic devices served by the hydraulic control system 202. A hydraulic device is defined to include any component or system that may use the hydraulic fluid. The hydraulic devices may include a clutch control component 214 for actuating the clutches as described previously and a lubrication component 216 which draws fluid to lubricate mechanical devices. A leakage component 218 is also included to account for internal leakage within the circuit. A base machine cooling component 220 may utilize hydraulic fluid from the hydraulic control system 202 in a continuous flow to cool the electric machine in a base machine cooling function. An active machine cooling component 222 may react to higher electric machine temperatures with a selectable or temperature driven active machine cooling function, providing additional cooling in the high temperature condition.

The fluid flow in the passages 204 may be regulated by a first pressure control device 230 (shown in FIG. 4). For example, the pressure control device 230 may be one of the pressure control solenoids 112, 116, shown in FIG. 3. Any suitable type of actuating device may be used for the pressure control device. The first pressure control device 230 may be energized (or actuated) and de-energized (or non-actuated) based upon operator demand. For example, when the vehicle is in "Park" as indicated by the transmission gear selector 95 and communicated by the user interface 13, there is no demand for torque and the pressure control device 230 is de-energized. When the vehicle is in "drive" as indicated by the transmission gear selector 95 and communicated by the user interface 13, there is demand for torque and the pressure control device 230 is energized.

A first pressure detection device 232 is fluidly connected to the pressure control device 230 to detect pressure of the fluid adjacent to the pressure detection device 232. The first pressure detection device 232 may be one of the second and fourth pressure switches 124 and 128, shown in FIG. 3. The pressure detection device 232 is adapted to indicate one of two operating states when the pressure control device 230 is de-energized. The pressure detection device 232 indicates a first operating state (no pressure detected) when the pressure is below a defined threshold pressure. The pressure detection device 232 indicates a second operating state (pressure detected) when the pressure is at or above the defined threshold pressure. The pressure detection device 232 is positioned or configured to have access to the fluid in the passages 204 even when the pressure control device 230 is de-energized.

For example, the pressure detection device 232 may be adapted to be sensitive to a threshold pressure of 150 kPa. When the pressure control device 230 is de-energized (no operator demand for torque), there may still be some fluid flow in the passage 204 that the first pressure detection device 232 may detect. If the pressure of the fluid flow is below 150 kPa, the pressure detection device 232 indicates the first operating state. If there is sufficient fluid flow that the fluid pressure exceeds 150 kPa, the pressure detection device 232 indicates the second operating state. As shown in FIG. 4, a second pressure control device 234 may be fluidly connected to a second pressure detection device 236. Any number of such devices may be used.

Figure 5:
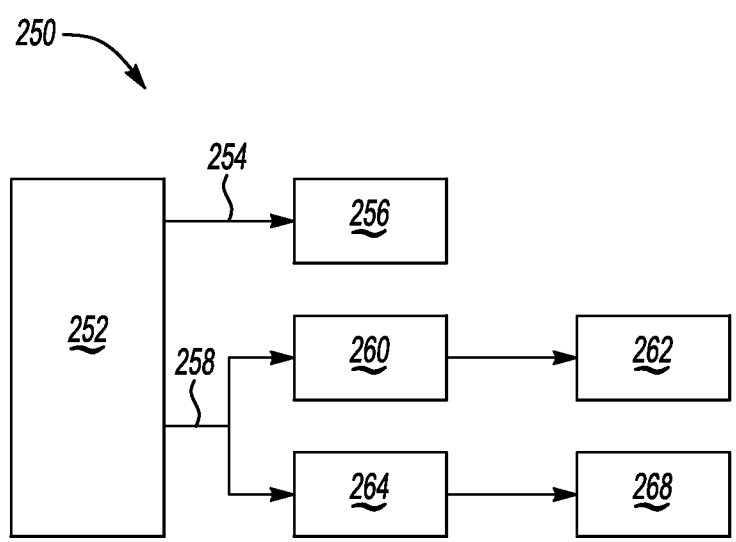
FIG. 5 is a schematic diagram of an override module to be applied to the line pressure estimation module of FIG. 4.

FIG. 5 schematically illustrates an override module 250 to be applied to the line pressure estimation module 200 of FIG. 4. The override module 250 corrects for an over-estimation of hydraulic line pressure in operating conditions such as low environmental temperatures. The override module 250 includes checking the state of the pressure detection device 232 when the pressure control device 230 is de-energized, as indicated by block 252.

When the pressure detection device indicates the first operating state, as indicated by line 254, the override module 250 sets the corrected hydraulic line pressure to a first calibrated value, as indicated by block 256. The first calibrated value may be zero. When the pressure detection device indicates the second operating state, as indicated by line 258, there are two options. First, if the estimated hydraulic line pressure is below the threshold pressure, as indicated by block 260, the override module 250 sets the corrected hydraulic line pressure to a second calibrated value, as indicated by block 262. The second calibrated value may be the threshold pressure. Second, if the estimated hydraulic line pressure is at or above the threshold pressure, as indicated by block 264, the override module 250 sets the corrected hydraulic line pressure to be the estimated hydraulic line pressure, as indicated by block 268.

While the best modes for carrying out the invention have been described in detail, those familiar with the art to which this invention relates will recognize various alternative designs and embodiments for practicing the invention within the scope of the appended claims.

The invention claimed is:

1. A method to detect the presence of hydraulic line pressure in a hydraulic control system, the method comprising:
   determining an estimated hydraulic line pressure of the hydraulic control system based upon an input flow and an output flow of hydraulic fluid;
   regulating the input flow and the output flow with a pressure control device, the pressure control device being energizable based on operator demand;
   fluidly connecting a pressure detection device to the pressure control device to obtain a measured hydraulic pressure surrounding the pressure detection device;
   configuring the pressure detection device to indicate a first operating state if the measured hydraulic pressure is below a threshold pressure when the pressure control device is de-energized;
   configuring the pressure detection device to indicate a second operating state if the measured hydraulic pressure exceeds the threshold pressure when the pressure control device is de-energized;
   comparing the estimated hydraulic line pressure to the threshold pressure and determining the first or second operating state indicated by the pressure detection device;
   applying an override function to correct the estimated hydraulic line pressure to a corrected hydraulic line pressure, based on said determining the first or second operating state indicated by the pressure detection device and said comparing the estimated hydraulic line pressure to the threshold pressure; and
   controlling the input flow and the output flow of hydraulic fluid based upon the corrected hydraulic line pressure.

2. The method of claim 1, wherein said applying the override function comprises:
   setting the corrected hydraulic line pressure to a first calibrated value when the pressure detection device indicates the first operating state;
   setting the corrected hydraulic line pressure to the threshold pressure when the pressure detection device indicates the second operating state and the estimated hydraulic line pressure is below the threshold pressure; and
   setting the corrected hydraulic line pressure to be the estimated hydraulic line pressure when the pressure detection device indicates the second operating state and the estimated hydraulic line pressure is at or above the threshold pressure.

3. A method to detect the presence of hydraulic line pressure in a hydraulic control system, the method comprising:
   determining an input flow from at least one hydraulic pump in the hydraulic control system;
   determining an output flow to at least one hydraulic device served by the hydraulic control system;
   determining an estimated hydraulic line pressure of the hydraulic control system based upon the input flow and the output flow;
   regulating the input flow and the output flow with a pressure control device, the pressure control device being energizable based upon operator demand;
   fluidly connecting the pressure detection device to the pressure control device to obtain a hydraulic pressure surrounding the pressure detection device;
   configuring the pressure detection device to indicate a first operating state if the measured hydraulic pressure is below a threshold pressure when the pressure control device is de-energized;
   configuring the pressure detection device to indicate a second operating state if the measured hydraulic pressure exceeds the threshold pressure when the pressure control device is de-energized;
   comparing the estimated hydraulic line pressure to the threshold pressure and determining the first or second operating state indicated by the pressure detection device;
   applying an override function to correct the estimated hydraulic line pressure to a corrected hydraulic line pressure, based on said determining the first or second operating state indicated by the pressure detection device and said comparing the estimated hydraulic line pressure to the threshold pressure; and
   controlling the input flow and the output flow based upon the corrected hydraulic line pressure.

4. The method of claim 3, wherein said determining the input flow from the hydraulic pump comprises:
   monitoring a fluid temperature of the input flow;
   monitoring a pump speed of the hydraulic pump; and
   determining the input flow based upon the fluid temperature and the pump speed of the hydraulic pump.

5. The method of claim 3, wherein the hydraulic device served by the hydraulic control system includes a hydraulically-actuated clutch.

6. The method of claim 3, wherein the hydraulic device served by the hydraulic control system includes an electrical machine.

7. The method of claim 3, further comprising:
   regulating the input flow from the hydraulic pump with at least one flow management valve, the flow management valve having one of two commanded positions; and
   selectively actuating the pressure control device and the flow management valve to direct the output flow to a hydraulically-actuated clutch based upon said one of said two commanded positions of the flow management valve.

8. The method of claim 3, wherein said applying the override function comprises:
   setting the corrected hydraulic line pressure to a first calibrated value when the pressure detection device indicates the first operating state;
   setting the corrected hydraulic line pressure to a second calibrated value when the pressure detection device indicates the second operating state and the estimated hydraulic line pressure is below the threshold pressure; and
   setting the corrected hydraulic line pressure to be the estimated hydraulic line pressure when the pressure detection device indicates the second operating state and the estimated hydraulic line pressure is at or above the threshold pressure.

9. The method of claim 8, wherein the first calibrated value is zero and the second calibrated value is the threshold pressure.

10. A hydraulic control system comprising:
a controller configured to control an input flow and an output flow of hydraulic fluid;
a line pressure estimation module stored on and executable by the controller to cause the controller to determine an estimated hydraulic line pressure based upon the input flow and the output flow of hydraulic fluid;
a pressure control device to regulate the input flow and the output flow, the pressure control device being energizable based on operator demand;
a pressure detection device fluidly connected to the pressure control device and configured to obtain a measured hydraulic pressure surrounding the pressure detection device;
wherein the pressure detection device is configured to indicate a first operating state if the measured hydraulic pressure is below a threshold pressure when the pressure control device is de-energized;
wherein the pressure detection device is configured to indicate a second operating state if the measured hydraulic pressure exceeds the threshold pressure when the pressure control device is de-energized; and
an override function stored on and executable by the controller to cause the controller to:
compare the estimated hydraulic line pressure to the threshold pressure and determine the first or second operating state indicated by the pressure detection device; and
correct the estimated hydraulic line pressure to a corrected hydraulic line pressure, based on said determining the first or second operating state indicated by the pressure detection device and said comparing the estimated hydraulic line pressure to the threshold pressure; and
wherein the controller is configured to control the input flow and the output flow of hydraulic fluid based on the corrected hydraulic line pressure.

11. The system of claim 10, wherein:
the override function sets the corrected hydraulic line pressure to a first calibrated value when the pressure detection device indicates the first operating state;
the override function sets the corrected hydraulic line pressure to a second calibrated value when the pressure detection device indicates the second operating state and the estimated hydraulic line pressure is below the threshold pressure; and
the override function sets the corrected hydraulic line pressure to be the estimated hydraulic line pressure when the pressure detection device indicates the second operating state and the estimated hydraulic line pressure is at or above the threshold pressure.

12. The system of claim 11, wherein the first calibrated value is zero and the second calibrated value is the threshold pressure.

* * * * *